United States Patent
Müller et al.

(10) Patent No.: US 9,902,299 B2
(45) Date of Patent: Feb. 27, 2018

(54) BEARING ARRANGEMENT FOR A REAR SEAT ARRANGEMENT OF A VEHICLE, AND METHOD FOR ASSEMBLING THE BEARING ARRANGEMENT

(71) Applicant: JOHNSON CONTROLS COMPONENTS GMBH & CO. KG, Kaiserslautern (DE)

(72) Inventors: Sascha Müller, Kaiserslautern (DE); Andreas Kinzer, Homburg (DE)

(73) Assignee: JOHNSON CONTROLS COMPONENTS GMBH & CO. KG, Kaiserslautern (DE)

( * ) Notice: Subject to any disclaimer, the term of this patent is extended or adjusted under 35 U.S.C. 154(b) by 231 days.

(21) Appl. No.: 14/766,214

(22) PCT Filed: Jan. 7, 2014

(86) PCT No.: PCT/EP2014/050146
§ 371 (c)(1),
(2) Date: Aug. 6, 2015

(87) PCT Pub. No.: WO2014/121961
PCT Pub. Date: Aug. 14, 2014

(65) Prior Publication Data
US 2015/0375645 A1   Dec. 31, 2015

(30) Foreign Application Priority Data

Feb. 7, 2013   (DE) .................. 10 2013 202 026
Aug. 22, 2013  (DE) .................. 10 2013 216 704

(51) Int. Cl.
*B60N 2/30*   (2006.01)
*B60N 2/427*  (2006.01)
(Continued)

(52) U.S. Cl.
CPC ........... *B60N 2/3013* (2013.01); *B60N 2/015* (2013.01); *B60N 2/305* (2013.01); *B60N 2/36* (2013.01);
(Continued)

(58) Field of Classification Search
CPC ...... B60N 2/3013; B60N 2/015; B60N 2/305; B60N 2/36; B60N 2/366; B60N 2/42; B60N 2/42079; F16C 43/02
(Continued)

(56) References Cited

U.S. PATENT DOCUMENTS 5,700,058 A * 12/1997 Balagurumurthy ...... B60N 2/20
                                                    297/378.1 X

FOREIGN PATENT DOCUMENTS

CN    101 553 381 A    10/2009
DE    20 2005 019 969 U1    3/2006
(Continued)

OTHER PUBLICATIONS

German Examination Report dated Nov. 22, 2017.

*Primary Examiner* — Anthony D Barfield
(74) *Attorney, Agent, or Firm* — McGlew and Tuttle, P.C.

(57) ABSTRACT

A bearing arrangement (4), for a rear seat arrangement of a vehicle, includes a bearing pin (5.2) which forms a rotational axis and a rotary bearing (5.3) which can be pushed onto the bearing pin (5.2). The bearing pin (5.2) and the rotary bearing (5.3) each have a mutually corresponding structure which secures the bearing pin (5.2) and the rotary bearing (5.3) against axial and radial movements relative to each other in a use position. The bearing pin (5.2) can be guided through openings (01, 02) of the rotary bearing (5.3) during assembly. The use position, which is secured against axial and radial movements, can be subsequently adjusted by pivoting the bearing pin (5.2) and/or the rotary bearing (5.3).

(Continued)

A method for assembling the bearing arrangement (4) is also provided.

16 Claims, 11 Drawing Sheets

(51) Int. Cl.
*B60N 2/015* (2006.01)
*B60N 2/36* (2006.01)
*B60N 2/42* (2006.01)
*F16C 43/02* (2006.01)

(52) U.S. Cl.
CPC ............... *B60N 2/366* (2013.01); *B60N 2/42* (2013.01); *B60N 2/42709* (2013.01); *F16C 43/02* (2013.01); *B60N 2205/35* (2013.01)

(58) Field of Classification Search
USPC .............................. 297/463.1, 463.2, 378.1
See application file for complete search history.

(56) References Cited

FOREIGN PATENT DOCUMENTS

| | | |
|---|---|---|
| DE | 10 2004 062517 A1 | 7/2006 |
| DE | 101 33 708 C1 | 12/2012 |
| DE | 10 2012 014497 A1 | 1/2014 |
| EP | 1 574 391 A1 | 9/2005 |
| WO | 2005/118332 A2 | 12/2005 |

* cited by examiner

BEARING ARRANGEMENT FOR A REAR SEAT ARRANGEMENT OF A VEHICLE, AND METHOD FOR ASSEMBLING THE BEARING ARRANGEMENT

CROSS REFERENCE TO RELATED APPLICATIONS

This application is a United States National Phase Application of International Application PCT/EP2014/050146 filed Jan. 7, 2014 and claims the benefit of priority under 35 U.S.C. § 119 of German Patent Applications 10 2013 202 026.0 filed Feb. 7, 2013 and 10 2013 216 704.0 filed Aug. 22, 2013, the entire contents of which are incorporated herein by reference.

FIELD OF THE INVENTION

The invention relates to a bearing arrangement for a rear seat arrangement of a vehicle.

The invention further relates to a method for assembling a bearing arrangement for a rear seat arrangement of a vehicle.

BACKGROUND OF THE INVENTION

Rear seat arrangements for vehicles having a plurality of backrest portions arranged adjacent to one another are generally known from the prior art. The backrest portions in this case are able to be pivoted independently of one another between at least two positions about a rotational axis for producing a folding mechanism. A bearing arrangement is provided for producing the pivoting movement, said bearing arrangement comprising a bearing pin aligned in the direction of the rotational axis and a rotary bearing. When assembling the bearing arrangement, the rotary bearing is pushed onto the bearing pin.

SUMMARY OF THE INVENTION

It is an object of the present invention to provide a bearing arrangement for a rear seat arrangement which is improved relative to the prior art and an improved method for assembling such a bearing arrangement.

The bearing arrangement according to the invention for a rear seat arrangement of a vehicle comprises a bearing pin forming a rotational axis and comprises a rotary bearing which is able to be pushed onto the bearing pin, wherein the bearing pin and the rotary bearing in each case have a mutually corresponding structure which secures the bearing pin and the rotary bearing against axial and radial displacements relative to one another in a position of use, wherein the bearing pin is guidable through openings of the rotary bearing during assembly, and the position of use which is secured against axial and radial displacements is subsequently adjustable by pivoting the bearing pin and/or the rotary bearing.

"Position of use" in this case is understood as a relative arrangement of the bearing pin and the rotary bearing to one another, which is adopted by both components during their designated operation.

In this case, the bearing arrangement according to the invention reliably prevents the rotary bearing from sliding off or slipping off the bearing pin during operation of the backrest without the use of additional components, so that the backrest parts of the rear seat arrangement effectively protect vehicle occupants, even in the case of a collision of the vehicle, from a load penetrating the vehicle interior from a luggage compartment adjacent to a rear seat arrangement. At the same time, the bearing arrangement is able to be assembled in a particularly simple manner and without a special tool and additional components.

In order to produce the structure for the bearing pin in a particularly simple manner, according to a development of the invention the structure of the bearing pin comprises at least two grooves which are spaced apart from one another and entirely surround an outer surface of the bearing pin.

In order to produce the structure for the rotary bearing in a particularly simple manner, according to one possible embodiment said rotary bearing comprises at least two wall regions which are arranged at the same distance from one another as the grooves, wherein the wall regions in each case comprise an opening with a sliding surface entirely surrounding the opening in each case.

According to one possible embodiment, the bearing pin is guided through the openings, wherein the sliding surfaces surrounding the openings in the position of use of the rotary bearing are rotatably arranged in the grooves and are therefore secured particularly reliably against axial and radial displacement.

In order to permit this securing against axial and radial displacement and at the same time the guidance of the bearing pin through the openings, according to a development of the invention the openings are arranged eccentrically to the rotational axis, i.e. eccentrically to the bearing pin in the position of use and, according to a further possible embodiment, said openings have an oval cross section.

In order to permit a particularly simple insertion and guidance of the bearing pin through the openings, in a development of the invention said openings are rotated relative to one another by 180°, such that segments of the openings, with the smallest diameters of the respective oval, face in opposing directions.

In one possible development of the invention, the diameter of the segments of the openings, with the smallest diameters of the respective oval, corresponds to a second diameter of the bearing pins in the region of the grooves. Thus it is not possible for the rotary bearing to be pushed onto the bearing pin and to slip off said bearing pin in different angular positions, or at least this is significantly impeded. Moreover, the rotary bearing is secured against radial displacements due to the support of the wall regions on the side walls of the grooves. As a result, the rotary bearing is reliably prevented from sliding off or slipping off the bearing pin during the operation of the rear seat arrangement, so that the backrest parts of the rear seat arrangement effectively protect vehicle occupants, even in the event of a collision of the vehicle, from a load penetrating the vehicle interior from a luggage compartment adjacent to the rear seat arrangement. At the same time, the bearing arrangement may be assembled in a particularly simple manner and without a special tool and additional components.

According to one possible embodiment, a diameter of segments of the openings, with the greatest diameters of the respective oval, corresponds at least to a first diameter of the bearing pins outside the regions of the grooves. Thus in a pivoted assembly position of the rotary bearing relative to the bearing pin, the first diameter of the regions which are defined by the grooves is open. In the position of use, however, only the second diameter corresponding to the grooves is open. Thus, during assembly it is possible for the bearing pin to be guidable through the openings in the assembly position which is different from the position of use, but in the position of use said bearing pin is in turn locked in the rotary bearing and is fixed inside the openings in the axial and radial directions.

In the method according to the invention for assembling a bearing arrangement, a rotary bearing is pushed onto a bearing pin forming a rotational axis of the bearing arrangement, wherein, when the rotary bearing is pushed on, said rotary bearing is pushed onto the bearing pin in an assembly position which is different from a position of use, wherein the bearing pin is guided through openings of the rotary bearing and subsequently the rotary bearing is pivoted relative to the bearing pin or the bearing pin is pivoted relative to the rotary bearing into the position of use, such that the bearing pin and the rotary bearing are secured relative to one another against an axial and radial displacement.

The method according to the invention permits in a particularly advantageous manner an assembly of the bearing arrangement which is able to be carried out in a particularly simple manner and without a special tool and additional components.

Exemplary embodiments of the invention are described in more detail hereinafter with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
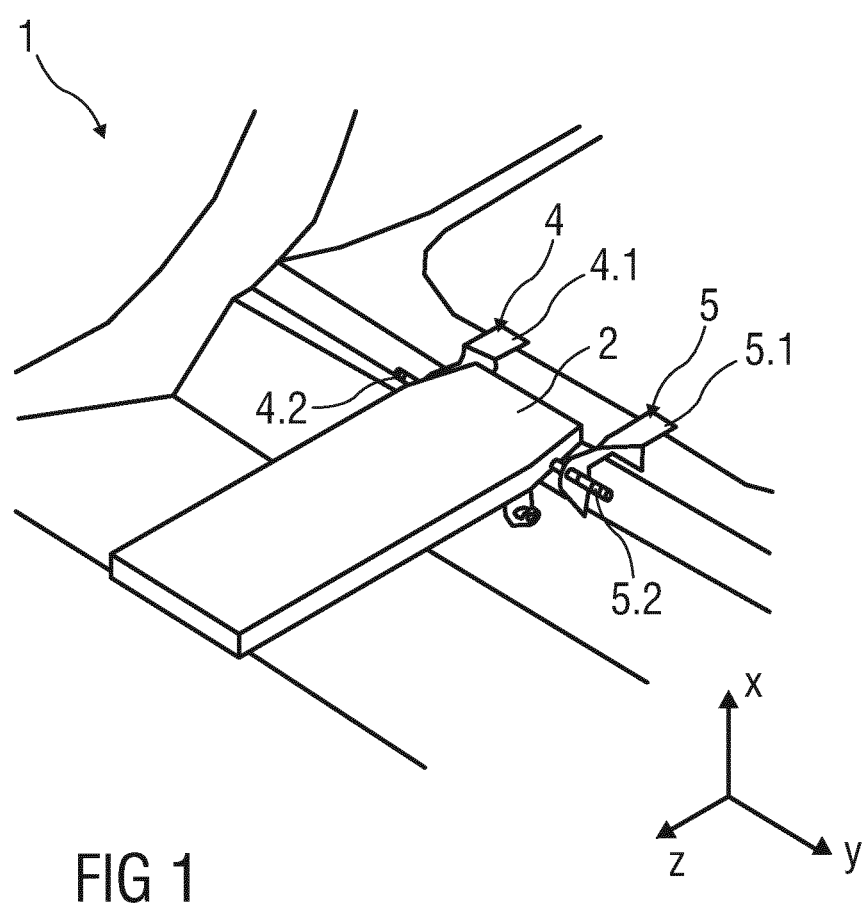
FIG. 1 is a schematic perspective view of a detail of a vehicle body with a backrest part.

Parts which correspond to one another are provided in all of the figures with the same reference numerals.

FIG. 1 shows in a perspective view a detail of a vehicle body 1 with a backrest part 2 of a rear seat arrangement, not shown.

The rear seat arrangement is designed in three parts and preferably comprises three seat surfaces, not shown, and three backrest parts, wherein a central backrest part 2 which forms approximately 20% of a backrest surface is exclusively shown in the view shown in the drawing. In FIGS. 2 to 9 a further backrest part 3 is shown. All of the backrest parts of the rear seat arrangement are in this case configured to be foldable about a rotational axis, wherein the rotational axis extends parallel to a vehicle axis y.

The central backrest part 2 is shown in a folded-down position and is foldably fastened to the vehicle body 1 by means of two fastening parts 4.1, 5.1. The fastening parts 4.1, 5.1 are in each case components of a bearing arrangement 4, 5. The description referring to FIGS. 1 to 13, relative to the bearing arrangement 5, is also transferable to the bearing arrangement 4.

Figure 3:
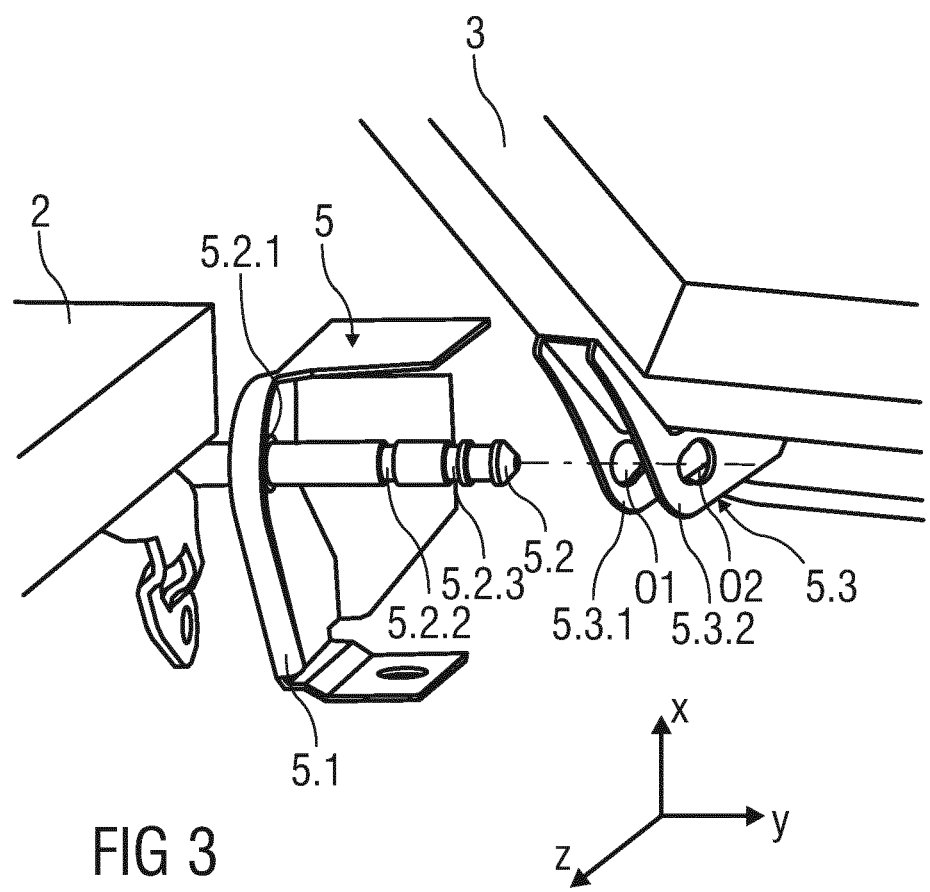
FIG. 3 is a schematic perspective view of a detailed view in the region of the bearing arrangement according to FIG. 2.

As shown in FIG. 3 in more detail, the fastening part 5.1 comprises a through-opening 5.1.1 for guiding a bearing pin 5.2 fastened to the backrest part 2. The bearing pin 5.2 comprises a projection 5.2.1 which entirely surrounds its outer surface and which prevents a displacement of the backrest part 2 in the axial direction, i.e. in the direction of the vehicle axis y. The bearing pin 5.2 is rotatably mounted in the through-opening 5.1.1.

Figure 2:
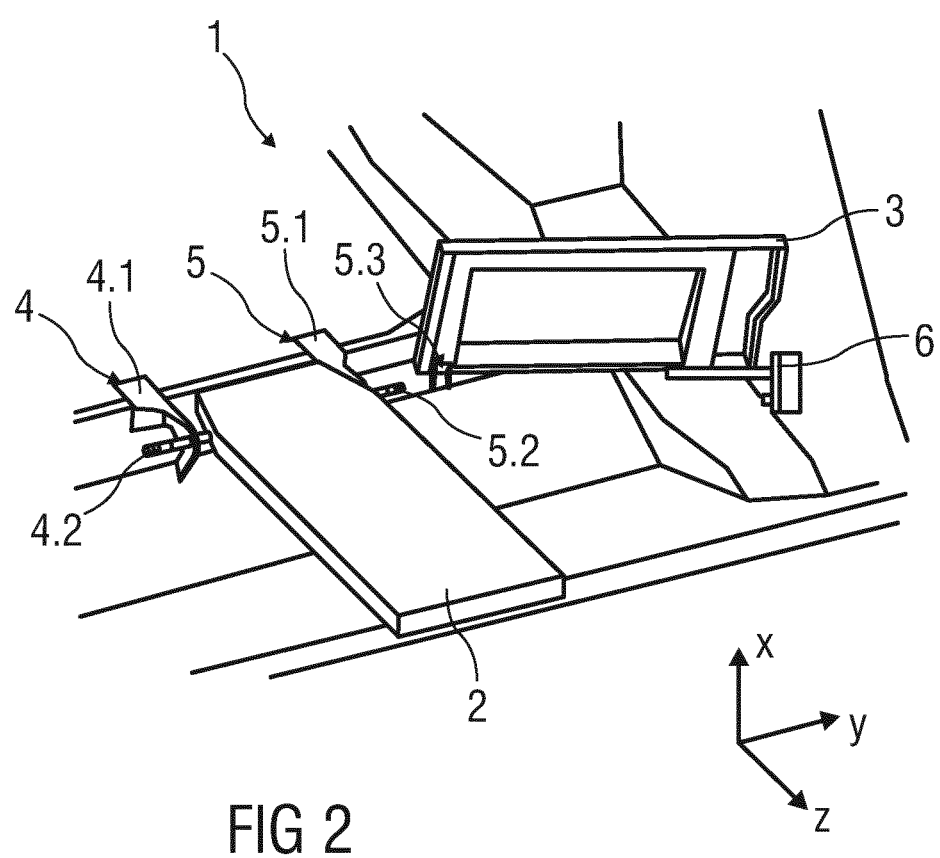
FIG. 2 is a schematic perspective view of a detail of a vehicle body with two backrest parts and a bearing arrangement according to the invention in a first assembly position.

FIG. 2 shows a perspective view of the detail of the vehicle body 1 with two backrest parts 2, 3 and the bearing arrangement 5 in a first assembly position. For mounting the backrest part 3 on the bearing pin 5.2, a rotary bearing which is able to be pushed onto the bearing pin 5.2 is arranged on the backrest part 3.

In FIG. 3 a perspective view is shown of a detailed view in the region of the bearing arrangement 5 in the first assembly position.

For the pivotable arrangement of the rotary bearing 5.3, the bearing pin 5.2 comprises two grooves 5.2.2, 5.2.3 which are spaced apart from one another and which entirely surround the outer surface of the bearing pin 5.2.

The rotary bearing 5.3 has two wall regions 5.3.1, 5.3.2 which are arranged at the same distance from one another as the grooves 5.2.2, 5.2.3. The wall regions 5.3.1, 5.3.2 in each case have an opening O1, O2 with a sliding surface which in each case entirely surrounds the opening O1, O2. The openings O1, O2 are provided for guiding the bearing pin 5.2 through the rotary bearing 5.3.

Figure 11:
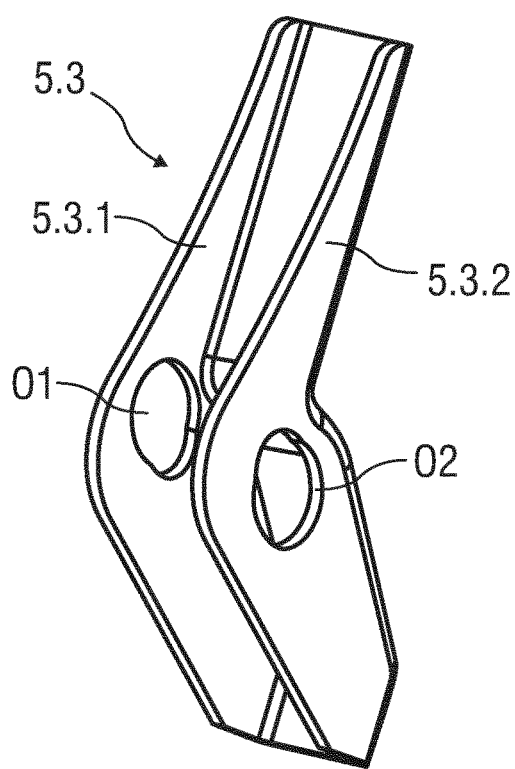
FIG. 11 is a schematic first perspective view of a rotary bearing of the bearing arrangement according to the invention.
Figure 12:
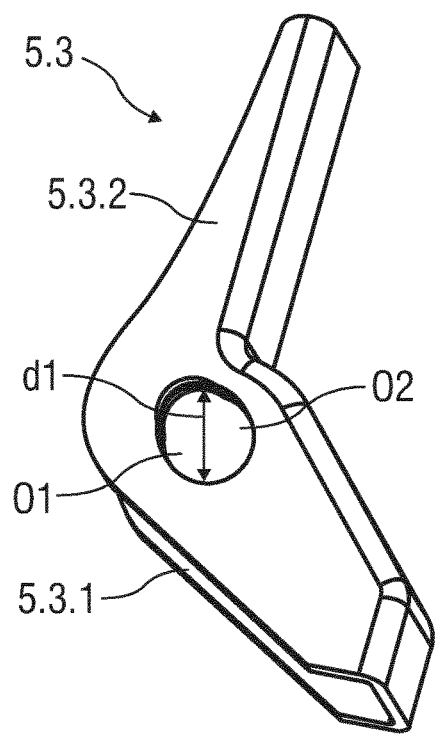
FIG. 12 is a schematic second perspective view of the rotary bearing according to FIG. 11.
Figure 13:
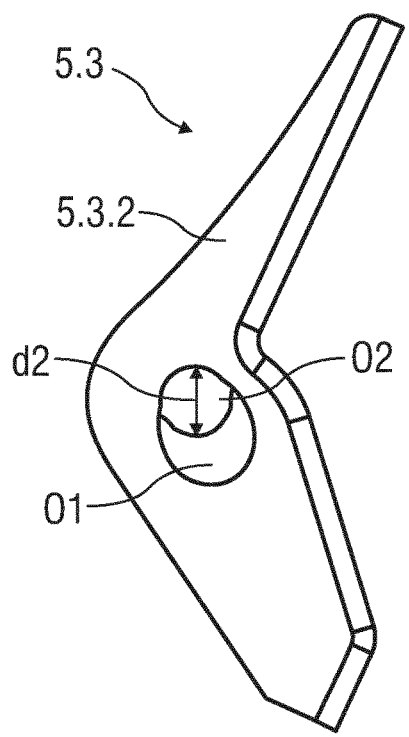
FIG. 13 is schematic side view of the rotary bearing according to FIG. 11.

The sliding surfaces surroundings the openings O1, O2 in a position of use of the rotary bearing 5.3, shown in more detail in FIGS. 6 to 9, are rotatably arranged in the grooves 5.2.2, 5.2.3 and secured against axial and radial displacement. In order to permit this securing and at the same time the guidance of the bearing pin 5.2 through the openings O1, O2, the openings O1, O2, as shown in more detail in FIGS. 11 to 13, are arranged eccentrically to the rotational axis, i.e. eccentrically to the bearing pin 5.2 in the position of use, and said openings have an oval cross section.

"Position of use" in this case is understood as a relative arrangement of the bearing pin 5.2 and the rotary bearing 5.3 to one another, which is adopted by both components during the designated operation of the rear seat arrangement.

For assembling the backrest part 3 and the rotary bearing 5.3 on the bearing pin 5.2, the backrest part 3 is aligned at an angle of more than 0° but less than 25° to the vehicle axis y and at an angle of approximately 45° to a vehicle axis z and the rotary bearing 5.3 is pushed onto the bearing pin 5.2 counter to the vehicle axis y. Thus it is not possible for the rotary bearing 5.3 to be pushed onto the bearing pin 5.2 and to slip off the bearing pin in different angular positions, or at least this is significantly impeded.

For fastening the backrest part 3 to the vehicle body 1 on a side remote from the bearing arrangement 5, a further bearing arrangement 6 is fastened to the backrest part 3.

Figure 4:
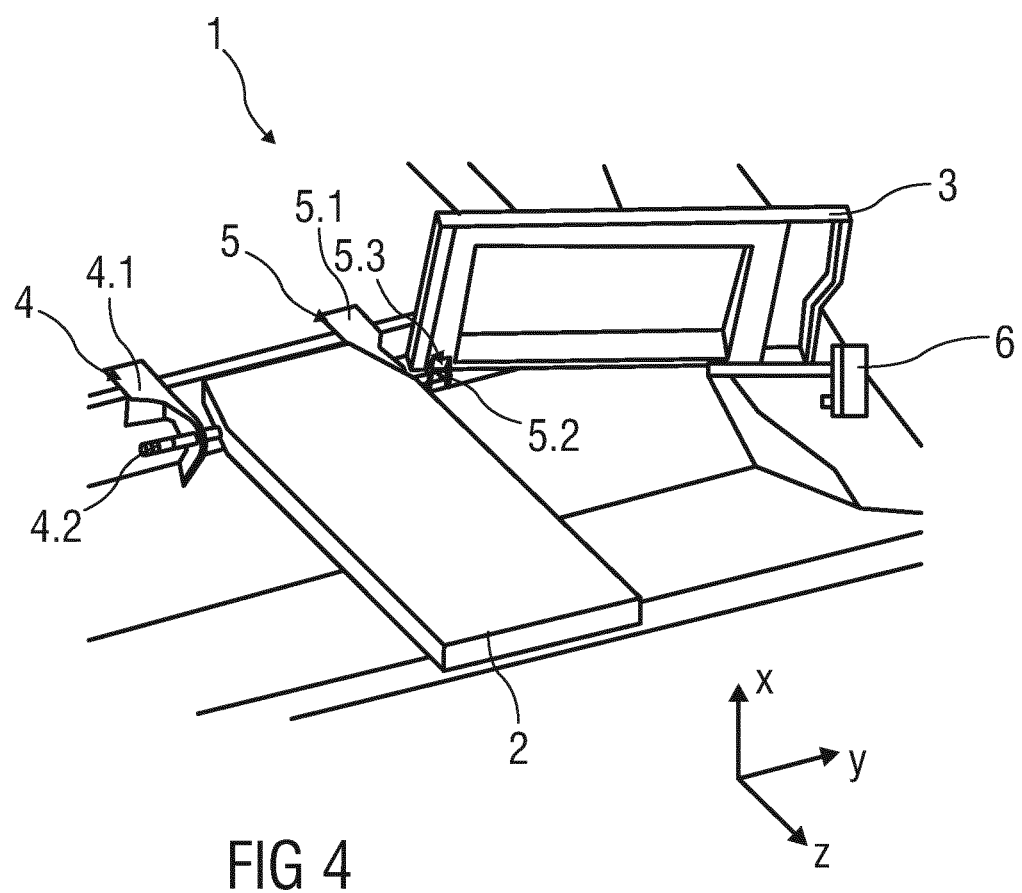
FIG. 4 is a schematic perspective view of the detail of the vehicle body with the two backrest parts and a bearing arrangement according to the invention in a second assembly position.
Figure 5:
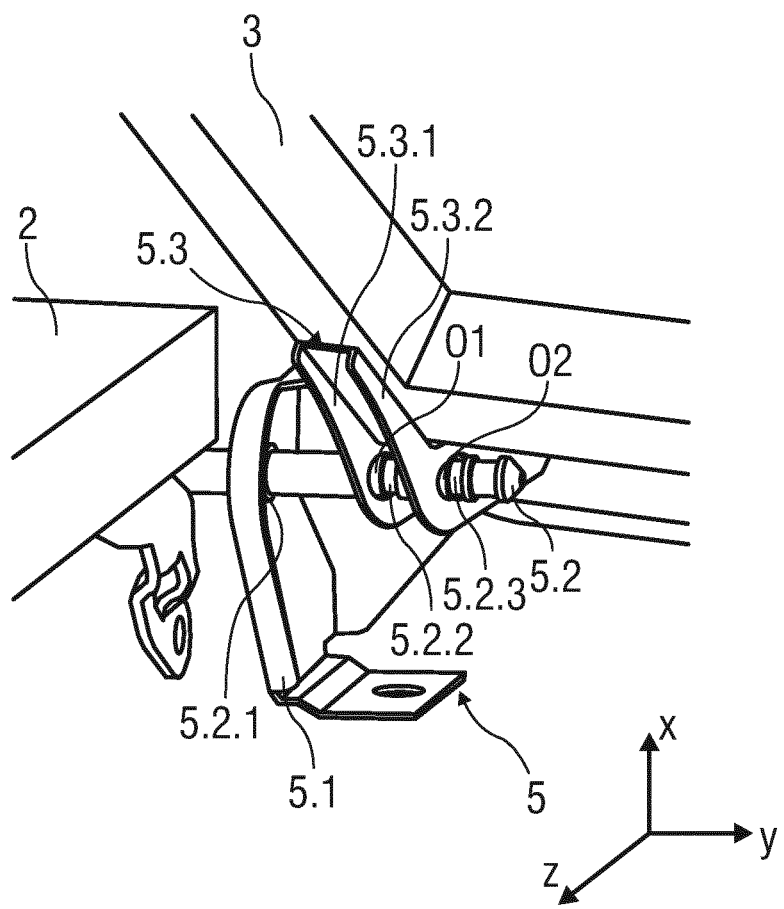
FIG. 5 is a schematic perspective view of a detailed view in the region of the bearing arrangement according to FIG. 4.

In FIGS. 4 and 5, the two backrest parts 2, 3 and the bearing arrangement 5 are shown in a second assembly position after the rotary bearing 5.3 has been pushed onto the bearing pin 5.2.

For the axial fixing of the rotary bearing 5.3 onto the bearing pin 5.2, the backrest part 3 and thus the rotary bearing 5.2 are pivoted such that they are arranged without an angular offset to the vehicle axis y. In other words, a normal vector of the openings O1, O2 extends in the same direction as the vehicle axis y. Subsequently, the bearing arrangement 6 is fastened to the vehicle body 1.

Figure 6:
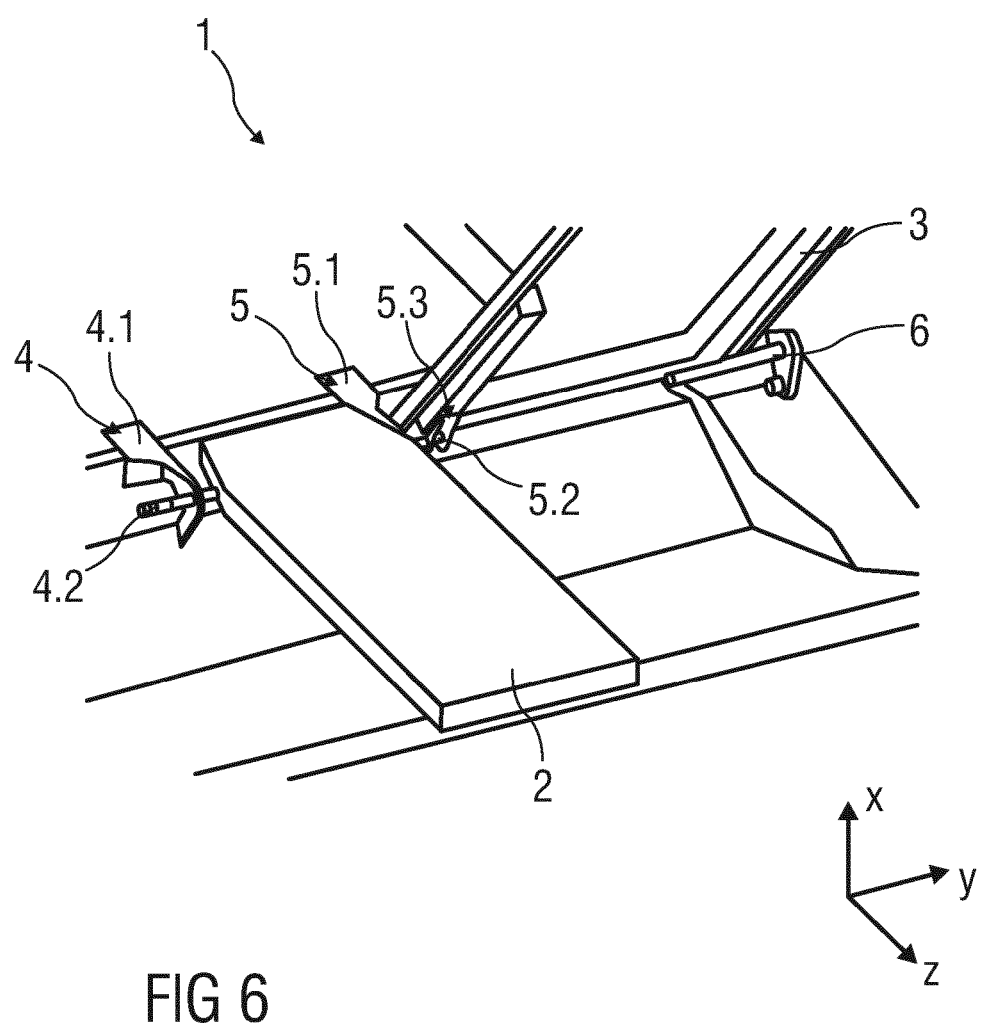
FIG. 6 is a schematic perspective view of the detail of the vehicle body with the two backrest parts and a bearing arrangement according to the invention in a position of use.
Figure 7:
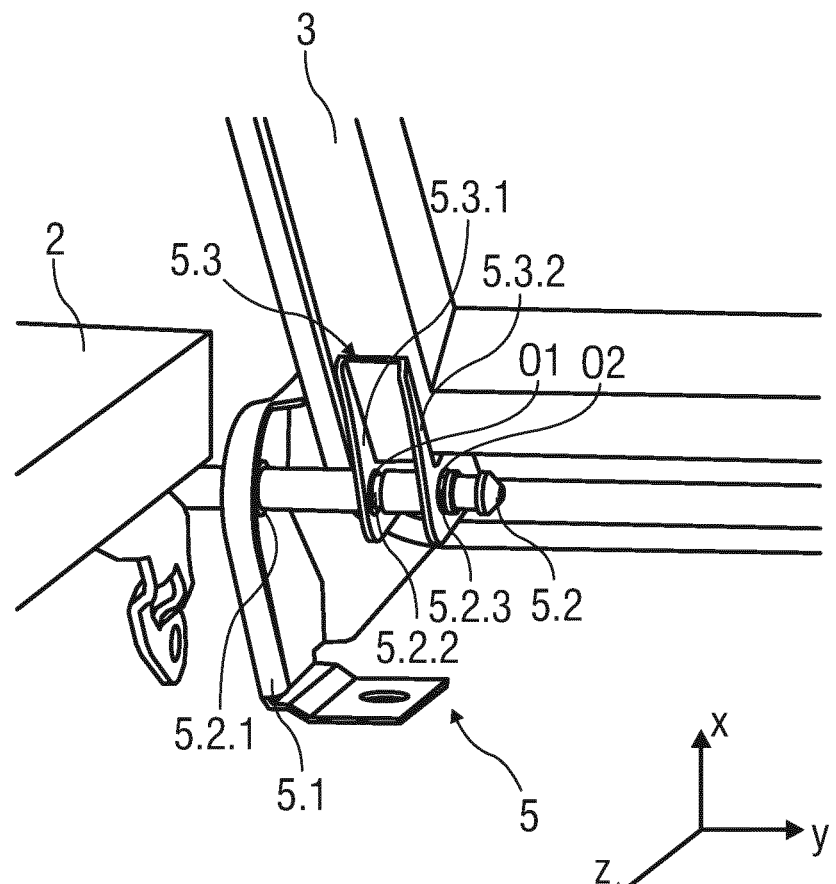
FIG. 7 is a schematic perspective view of a detailed view in the region of the bearing arrangement according to FIG. 6.

FIGS. 6 and 7 show this pivoted arrangement. In this case, the sliding surfaces of the rotary bearing 5.3 are rotatably arranged on the bottom surfaces of the grooves 5.2.2, 5.2.3 and thus secured against radial displacements. Moreover, the rotary bearing 5.3 is secured against radial displacements due to the support of the wall regions 5.3.1, 5.3.2 on the side walls of the grooves 5.2.2, 5.2.3. As a result, the rotary bearing 5.3 is reliably prevented from sliding off or slipping off the bearing pin 5.2 during operation of the rear seat arrangement, so that the backrest parts 2,3 of the rear seat arrangement effectively protect vehicle occupants, even in the event of a collision of the vehicle, from a load penetrating the vehicle interior from a luggage compartment adjacent to the rear seat arrangement. At the same time, the bearing arrangement 5 is able to be assembled in a particularly simple manner without a special tool and additional components.

Figure 8:
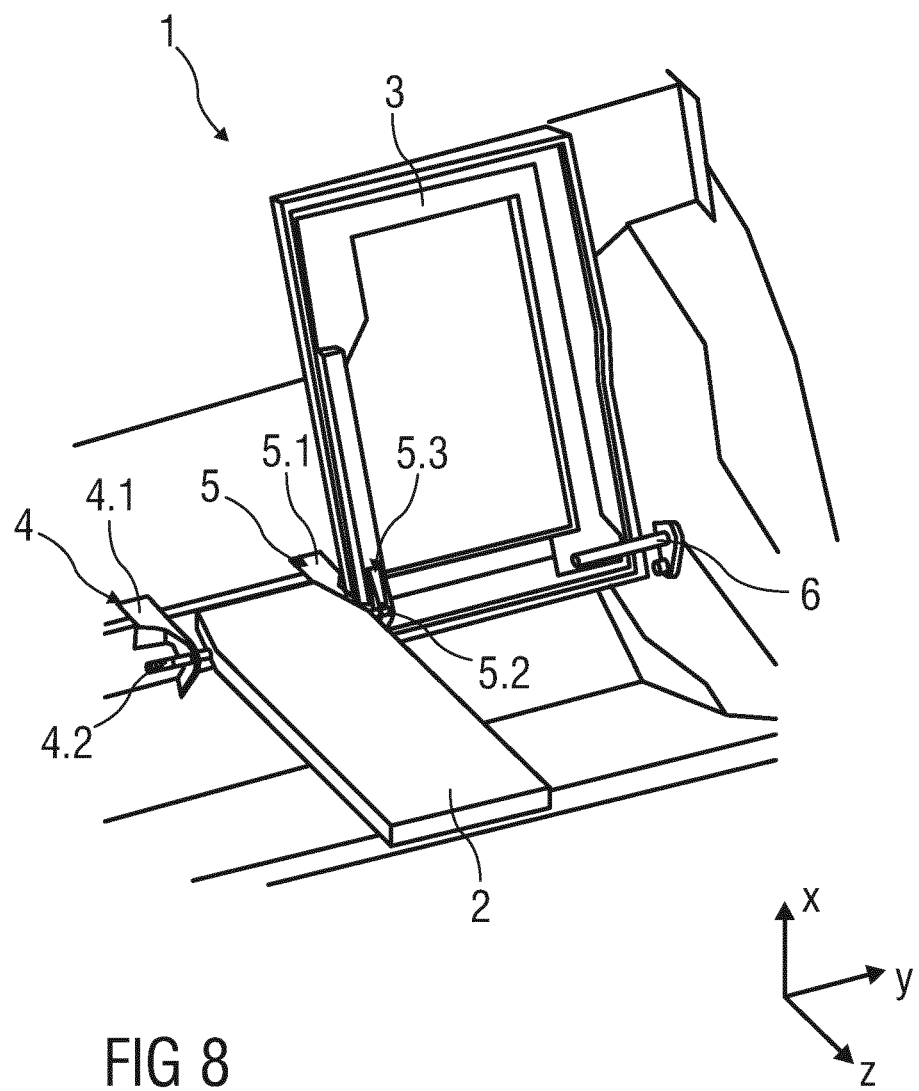
FIG. 8 is a schematic perspective view of the detail of the vehicle body with the two backrest parts and a bearing arrangement according to the invention in a position of use, wherein a backrest part is locked in a backrest lock.
Figure 9:
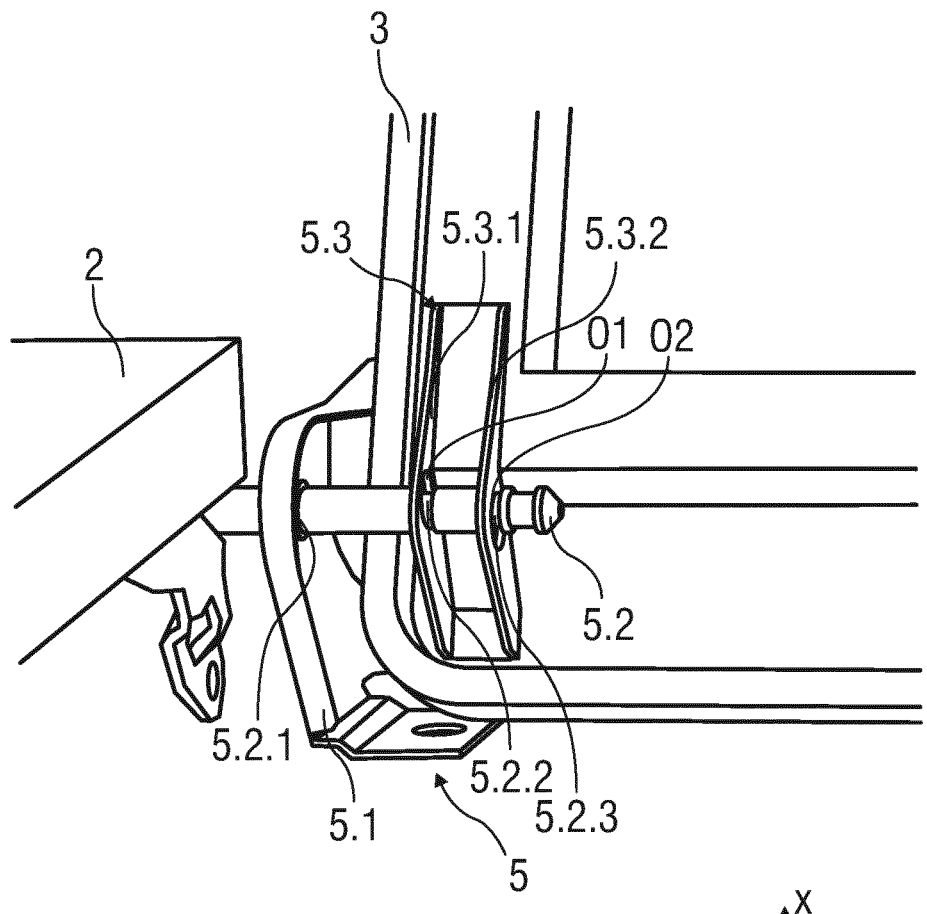
FIG. 9 is a schematic perspective view of a detailed view in the region of the bearing arrangement according to FIG. 8.

FIGS. 8 and 9 show the two backrest parts 2, 3 and the bearing arrangement 5 in the position of use, wherein the backrest part 3 is locked in a backrest lock, not shown.

Figure 10:
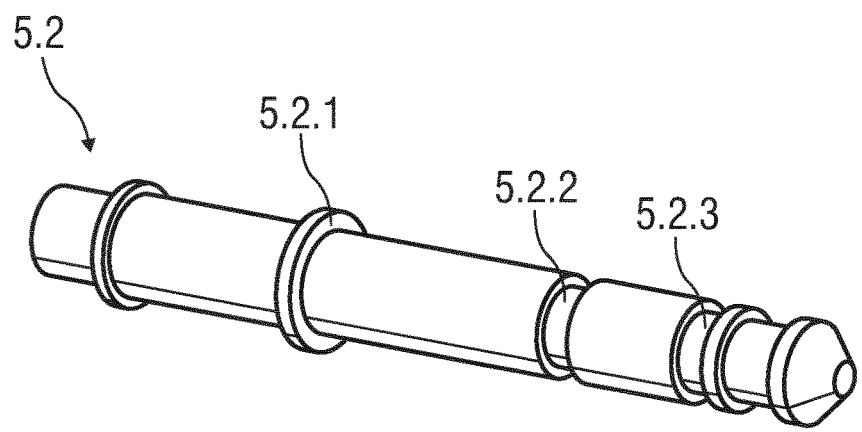
FIG. 10 is a schematic perspective view of a bearing pin of the bearing arrangement according to the invention.

A perspective view of the bearing pin 5.2 of the bearing arrangement 5 according to the invention, with the projection 5.2.1 and the two grooves 5.2.2, 5.2.3, is shown in FIG. 10. In the regions immediately adjacent to the grooves, 5.2.2, 5.2.3, the bearing pin 5.2 in this case has a first diameter d1 shown in FIG. 12 and in turn a second diameter d2 in the region of the grooves 5.2.2, 5.2.3.

FIG. 11 shows a first perspective view of the rotary bearing 5.3 of the bearing arrangement 5 according to the invention with the wall regions 5.3.1, 5.3.2 and the openings O1, O2 formed therein. The openings O1, O2 are in this case of oval configuration, wherein the openings O1, O2 are rotated relative to one another by 180° such that segments of the openings O1, O2, with the smallest diameters of the respective oval, face in opposing directions.

Thus it is possible that in the pivoted assembly position of the rotary bearing 5.3 relative to the bearing pin 5.2, shown in FIGS. 2 to 5, the first diameter d1 corresponding to the regions adjacent to the grooves 5.2.2, 5.2.3 is open, as shown in FIG. 12. In the position of use, however, only the second diameter d2 corresponding to the grooves 5.2.2, 5.2.3 is open as FIG. 13 shows. Thus, during assembly, the bearing arrangement 5 permits the bearing pin 5.2 to be guidable through the openings O1, O2 in the assembly position, which is different from the position of use, but in the position of use the bearing pin is in turn locked in the rotary bearing 5.3 and fixed in the axial and radial directions inside the openings O1, O2.

While specific embodiments of the invention have been shown and described in detail to illustrate the application of the principles of the invention, it will be understood that the invention may be embodied otherwise without departing from such principles.

The invention claimed is:

1. A bearing arrangement for a rear seat arrangement of a vehicle, the bearing arrangement comprising:
a bearing pin forming a rotational axis; and
a rotary bearing which is able to be pushed onto the bearing pin, wherein the bearing pin and the rotary bearing in each case have a mutually corresponding structure which secures the bearing pin and the rotary bearing against axial and radial displacements relative to one another in a position of use, the structure of the bearing pin comprising at least two grooves which are spaced apart from one another and entirely surround an outer surface of the bearing pin, the structure of the rotary bearing comprising at least two wall regions which are arranged at the same distance from one another as the grooves, the wall regions in each case comprising an opening with a sliding surface entirely surrounding the opening in each case, wherein the bearing pin is guidable through openings of the rotary bearing during assembly, and the position of use which is secured against axial and radial displacements is subsequently adjustable by pivoting the bearing pin and/or the rotary bearing, the openings being arranged eccentrically to a rotational axis of the bearing pin which is located in the position of use.

2. The bearing arrangement as claimed in claim 1, wherein the bearing pin is guided through the openings, wherein the sliding surfaces, surrounding the openings in the position of use of the rotary bearing, are rotatably arranged in the grooves.

3. The bearing arrangement as claimed in claim 1, wherein the openings have an oval cross section.

4. The bearing arrangement as claimed in claim 3, wherein the openings are rotated relative to one another by 180°, such that segments of the openings, with the smallest diameters of the respective oval, face in opposing directions.

5. The bearing arrangement as claimed in claim 4, wherein the diameter of the segments of the openings, with the smallest diameters of the respective oval, corresponds to a second diameter of the bearing pins in the region of the grooves.

6. The bearing arrangement as claimed in claim 4, wherein a diameter of segments of the openings, with the greatest diameters of the respective oval, corresponds at least to a first diameter of the bearing pins outside the regions of the grooves.

7. A vehicle rear seat arrangement bearing arrangement comprising:
a bearing pin forming a rotational axis and having a bearing pin outer contour;
a rotary bearing defining openings receiving the bearing pin, the openings having an openings contour, the bearing pin outer contour and the rotary bearing openings contour having corresponding shapes to define mutually corresponding structures wherein the mutually corresponding structures define pushing path guideway for the rotary bearing to be pushed onto a bearing pin in an assembly relative rotational extent which is different from a use relative rotational extent and to form a rotational axis of the bearing arrangement and to define a securing connection, securing the bearing pin and rotary bearing against a relative axial and a radial displacement in the use relative rotational extent, the bearing pin outer contour comprising grooves which are spaced apart from one another and which entirely surround an outer surface of the bearing pin, the rotary bearing comprising two wall regions arranged at the same distance from one another as the grooves, the wall regions each defining one of the openings, the openings having an oval cross section.

8. The bearing arrangement as claimed in claim 7, wherein:

the bearing pin is guided through pushing path guideway; and sliding surfaces are rotatably arranged in the grooves and surround the openings in the use relative rotational extent.

9. The bearing arrangement as claimed in claim 7, wherein the openings are eccentric to the rotational axis of the bearing pin.

10. The bearing arrangement as claimed in claim 7, wherein the openings are rotationally offset 180° relative to one another whereby segments of the openings, with a smallest dimension of the respective oval, face in opposing directions.

11. The bearing arrangement as claimed in claim 10, wherein the smallest dimensions of the respective oval corresponds to a dimension of the bearing pins in a region of the grooves.

12. The bearing arrangement as claimed in claim 10, wherein segments of the openings with a greatest dimension of the respective oval correspond at least to a first dimension of the bearing pins outside of a region of the grooves.

13. A bearing arrangement for a rear seat arrangement of a vehicle, the bearing arrangement comprising:

a bearing pin forming a rotational axis; and a rotary bearing which is able to be pushed onto the bearing pin, wherein the bearing pin and the rotary bearing in each case have a mutually corresponding structure which secures the bearing pin and the rotary bearing against axial and radial displacements relative to one another in a position of use, the structure of the bearing pin comprising at least two grooves which are spaced apart from one another and entirely surround an outer surface of the bearing pin, the structure of the rotary bearing comprising at least two wall regions which are arranged at the same distance from one another as the grooves, the wall regions in each case comprising an opening with a sliding surface entirely surrounding the opening in each case, wherein the bearing pin is guidable through openings of the rotary bearing during assembly, and the position of use which is secured against axial and radial displacements is subsequently adjustable by pivoting the bearing pin and/or the rotary bearing, the openings having an oval cross section.

14. The bearing arrangement as claimed in claim 13, wherein the openings are rotated relative to one another by 180°, such that segments of the openings, with the smallest diameters of the respective oval, face in opposing directions.

15. The bearing arrangement as claimed in claim 14, wherein the diameter of the segments of the openings, with the smallest diameters of the respective oval, corresponds to a second diameter of the bearing pins in the region of the grooves.

16. The bearing arrangement as claimed in claim 14, wherein a diameter of segments of the openings, with the greatest diameters of the respective oval, corresponds at least to a first diameter of the bearing pins outside the regions of the grooves.

* * * * *